March 30, 1965 D. A. KELLY 3,175,849
ROTARY FLUID COUPLING
Filed Nov. 18, 1959 2 Sheets-Sheet 1
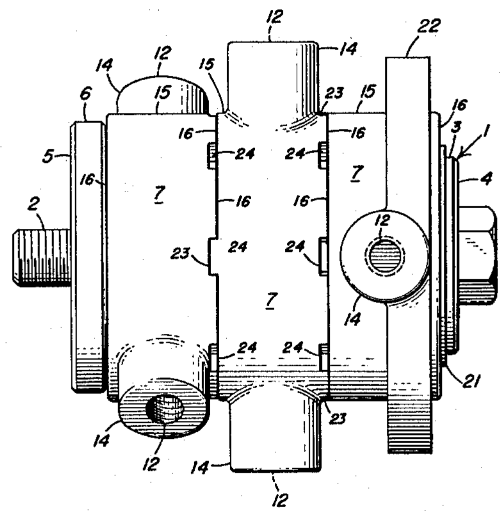
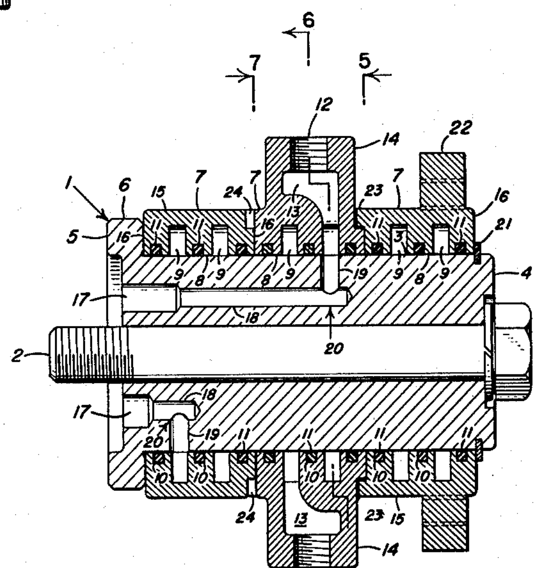
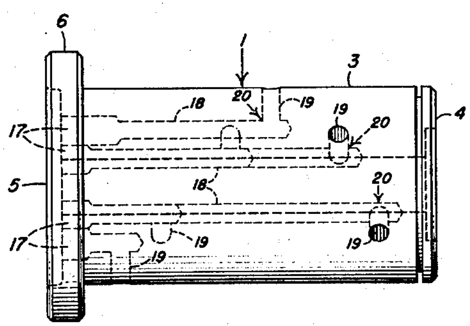
Inventor:
Daniel Allcott Kelly
By Wilmer Mechlin
his Attorney

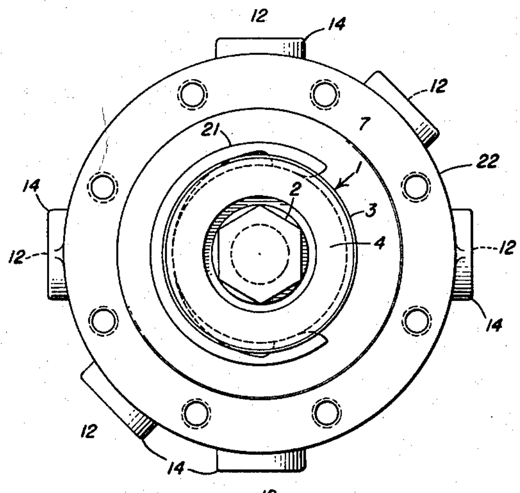
FIG. 2
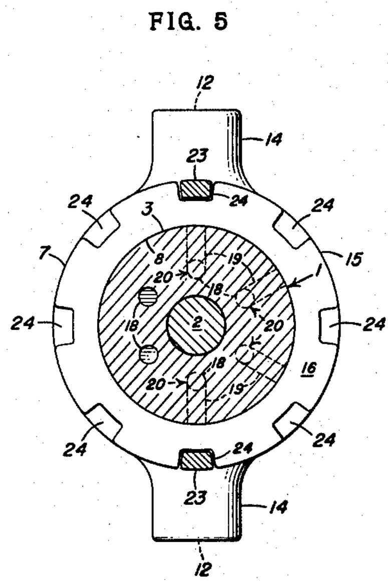
FIG. 5
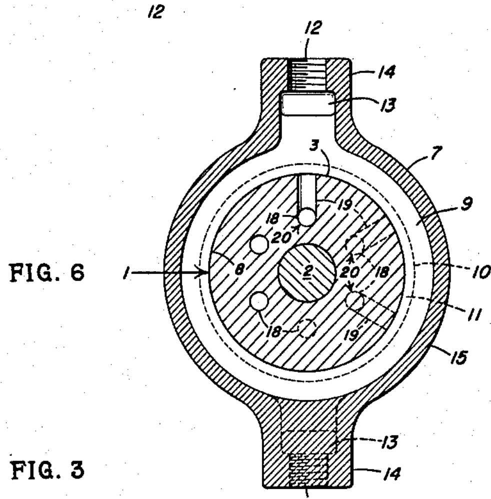
FIG. 6
FIG. 3
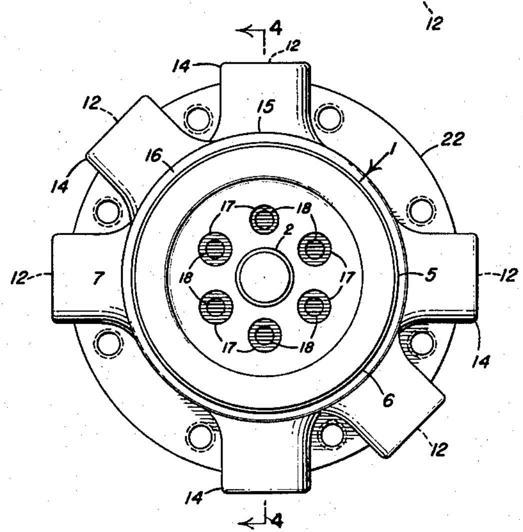
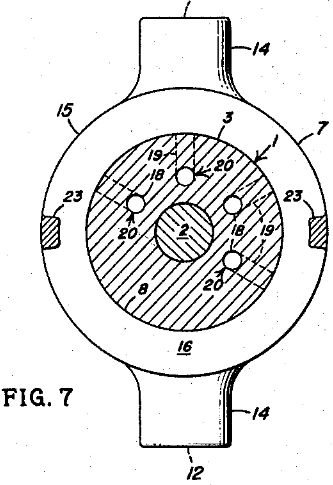
FIG. 7
Inventor:
Daniel Allcott Kelly
By Wilmer Mechlin
his Attorney United States Patent Office 3,175,849 Patented Mar. 30, 1965

3,175,849

ROTARY FLUID COUPLING

Daniel Allcott Kelly, Salem, Va., assignor to Graham-White Sales Corporation, Salem, Va., a corporation of Virginia Filed Nov. 18, 1959, Ser. No. 853,887
1 Claim. (Cl. 285—137)

This invention relates to rotary fluid couplings and has for an object the provision of an improved rotary fluid coupling which is relatively simple and rugged in construction and effective in operation.

Another object of the invention is to provide an improved rotary fluid coupling wherein one of the relatively rotatable means is a cylindrically surfaced spindle and the other is a plurality of basically similar collars selectively mountable on the spindle for adapting the coupling to installations of differing requirements.

An additional object of the invention is to provide an improved rotary fluid coupling having as its relatively rotatable means a cylindrically surfaced spindle and a plurality of radially ported collars, the ports of which separately communicate with ports in the spindle, wherein the collars are interlockable in any of a plurality of circumferentially spaced positions to suit the requirements of a particular installation.

Other objects and advantages of the invention will appear hereinafter in the detailed description, be particularly pointed out in the appended claim and be illustrated in the accompanying drawings, in which;

FIGURE 1 is a side elevational view of a preferred embodiment of the rotary fluid coupling of the present invention;

FIGURE 2 is a front elevational view of the coupling of FIGURE 1;

FIGURE 3 is a rear elevational view of the coupling of FIGURE 1;

FIGURE 4 is a vertical sectional view taken along the lines 4—4 of FIGURE 3;

FIGURE 5 is a vertical sectional view taken along the lines 5—5 of FIGURE 4;

FIGURE 6 is a vertical sectional view taken along the lines 6—6 of FIGURE 4;

FIGURE 7 is a vertical sectional view taken along the lines 7—7 of FIGURE 4; and FIGURE 8 is a side elevational view of the stem of the coupling of FIGURE 1 removed from the remaining structure.

Referring now in detail to the drawings, in which like reference characters designate like parts, the improved rotary fluid coupling of the present invention is adapted for application to hose reels, power shovels or other installations in which air or other fluid is required to be transmitted between two relatively rotatable members, such as the stand and reel of a hose reel and the base and cab of a power shovel.

The improved coupling is comprised of a cylindrically surfaced spindle, shaft or hub 1 which is adapted to be suitably fixed or secured to or mounted on one of the relatively rotatable members (not shown) between which fluid is required to be transmitted, concentric with the axis of relative rotation of the members, the illustrated spindle being so fixable against relative rotation to one of the members by a bolt 2 extending axially therethrough. Extending or projecting from the member on which it is mounted into the other member, the spindle 1 has a cylindrical surface or periphery 3 extending to its outer or distal end 4. At or toward the opposite, inner or proximal end 5 of the spindle 1, the cylindrical surface 3 is bounded by an annular lip or flange 6 which, depending on the installation, may be secured to or, as here, integral with the spindle.

Rotatably mounted on the cylindrical surface 3 of the spindle 1 in coaxial, end-abutting relationship, are a plurality of generally cylindrical collars, sleeves or discs 7, each of which has, in or interrupting its inner or spindle-confronting cylindrical face or surface 8, one or preferably a plurality of axially spaced, circumferential or annular channels 9. Each of the channels 9 in each collar 7 is bracketed by or included between axially spaced, circumferential or annular grooves 10 in or interrupting the inner face 8 of the collar and each receiving or seating an O-ring or like gasket 11, the latter individual or discrete to the collar in which it is received and sealingly engaging the cylindrical surface 3 of the spindle and axially sealing or separating the channels, fluid-tight, from each other and ambient air. Each of the collars 7 has a port 12 for and fluid-connected through an intervening conduit 13 to each of its channels 9 and opening radially to the exterior, each of the ports being threaded or otherwise fitted for connection to a pipe or fluid line (not shown) and preferably being formed in a boss 14 projecting radially from and centered on the periphery 15 of the collar intermediate the latter's ends 16. The bosses on each collar, if a plurality, are circumferentially spaced and for each of the illustrated two-channel collars, preferably are diametrically opposed.

Each of the ports 12 is designed for fluid connection to or communication with one of a corresponding number or plurality of ports 17 in and circumferentially spaced about the proximal end 5 of the spindle 1. Each of the illustrated spindle ports 17 extends longitudinally or axially into the spindle 1 and, like the collar ports 12, is threaded or otherwise fitted for connection to a pipe or other fluid line (not shown). In the spindle 1 are a plurality of passages or drillings 18 extending longitudinally or axially thereof and circumferentially spaced about the spindle's axis. Each of these longitudinal or axially extending passages opens at one end onto and conveniently is longitudinally aligned or concentric with one of the spindle ports 17 and extends into the spindle to or slightly beyond the position, axially of the spindle, of the channel 9 of one of the collar ports 12 and is connected or open to that channel by a radial passage or drilling 19 branching from the longitudinal passage and aligning laterally or radially of the spindle with the channel. Each of the longitudinally extending passages 18 and the connected radial passage 19 thus form the legs of a passage 20 through the spindle individual or discrete to and connecting or establishing communication between one of the spindle ports 17 and one of the collar ports 12, with the spindle passages 20 thus varying in the lengths of their longitudinal legs or passages 18 and disposition of their radial or lateral legs or passages 19 in correspondence with the variation in the axial spacings of the channels 9 in the collars 7 from the proximal end 5 of the spindle.

The collars 7 are designed to be slid over the distal end 4 of the spindle 1 and, by making their inside diameters substantially the same as the outside diameter of the spindle's cylindrical surface 3, to have a sliding fit with the latter. When in position on the spindle, the collars are held in place by the outstanding annular lip 6 at the spindle's proximal end 5 and a snap ring or other suitable keeper 21 attached to the spindle after assembly of the collars, to or adjacent the spindle's distal end 4.

Since the axial spacing or span between the lip 6 and the keeper 21 must be such, relative to the axial span of the collars 7, as not to interfere with rotation of the latter collectively on the spindle 1, the collars, unless otherwise prevented, would tend to rotate with the spindle under the friction engendered by the O-rings 11 and place a strain on their connections to the pipes (not shown) in the reel, cab or other of the relatively rotatable members of the installation to which the coupling is applied. To eliminate any strain on such connections, it therefore is necessary not only that the spindle 1 be secured against rotation to the member on which it is mounted, but that the collars 7 be held against rotation with the spindle and relative to the other of the relatively rotatable members of the installation. This is here accomplished by bolting or otherwise securing the outer or distal collar to that member, conveniently by providing that collar with a radially outstanding annular flange 22 apertured to receive the securing means, and by interlocking the collars with each other. For the latter purpose and at the same time to enable the collar 7, during assembly, selectively to be rotated relatively to any of a plurality of circumferentially spaced positions to suit the lines to which their ports 12 are to be connected in the particular installation, all of the collars except that at one, here the distal end 4, of the spindle, have at one of their ends 16 one or preferably a plurality of circumferentially spaced, interlocking or positioning lugs or fingers 23 projecting longitudinally or axially of the collar from or beyond that end, each of the lugs being adapted to overlap the adjoining collar and selectively fit, interfit with, or be received in any of a plurality of circumferentially spaced slots or notches 24 in the latter. Thus if, as in the illustrated embodiment, there are, all told, three collars, one of the end collars will have positioning lugs 23 on one end, the other end collar will have notches 24 in its opposite end, and the intermediate or intervening collar will have notches in its end confronting the first collar and lugs on its end confronting the second.

Not only are the illustrated collars adapted for connection to the illustrated spindle, but by selectively assembling collars each identical in form with one of the three illustrated, it is possible to use these three forms to make up a coupling requiring any number of collars, from two up, to provide the fluid connections required in a particular installation. For example, if only four connections were needed, the intervening collar would be dispensed with and the end collars alone would be applied to a spindle correspondingly shortened and with its number of spindle ports 17 correspondingly reduced. If, on the other hand, eight connections were required, the end collars of the illustrated embodiment would be assembled with two collars identical with the intervening collar on a spindle correspondingly increased in length and with a corresponding increase in its number of spindle ports. Too, in any installation, the collar ports 12 may be the inlets and the spindle ports 17 the outlets. The use of a plurality of collars rather than a single collar of the combined dimension of the plurality also is of prime importance in any installation in which clearance is at a premium, since it enables the collars to be removed in turn for repair or replacement from the distal end 4 of the spindle 1 within an end clearance sufficient to accommodate but one of the collars.

From the above detailed description, it will be apparent that there has been provided an improved rotary fluid coupling which not only is simple and effective but in its collars lends itself to standardization for installations of widely varying requirements in the number and position of the connections. It should be understood that the described and disclosed embodiment is merely exemplary of the invention and that all modifications are intended to be included which do not depart from either the spirit of the invention or the scope of the appended claim.

Having described my invention, I claim:

A rotary fluid coupling comprising a spindle having a cylindrical surface, a plurality of spaced passages extending axially and radially of said spindle, a port in said spindle in communication with each of said passages, a plurality of collars rotatably mounted on said spindle surface and relatively rotatable thereon during assembly, lug means at ends of certain of said collars and selectively interfittable with slot means in ends of adjoining collars for enabling said collars during assembly to be selectively positioned in any of a plurality of circumferentially spaced positions relative to each other, said collars having annular channels in inner faces thereof each connecting to one of said passages, sealing means carried by and individual to each collar and bracketing each of said channels therein for axially sealing the connection between each channel and the associated passage, a radial port in each of said collars and each connected to one of said channels and through the associated passage to one of said ports in said spindle, and means on said spindle and operative after assembly of said collars for restraining relative axial movement therebetween and thereby enabling said interfitting means to interlock said collars against relative rotation in their selected positions.

References Cited in the file of this patent

UNITED STATES PATENTS

| | | |
|---|---|---|
| 169,342 | Cushing | Nov. 2, 1875 |
| 470,237 | Freeman | Mar. 8, 1892 |
| 1,851,723 | Neidow | Mar. 29, 1932 |
| 2,423,069 | McElhose | June 24, 1947 |
| 2,659,615 | McClain | Nov. 17, 1953 |
| 2,781,134 | Weir | Feb. 12, 1957 |
| 2,943,868 | Hanback | July 5, 1960 |

FOREIGN PATENTS

| | | |
|---|---|---|
| 656,881 | Great Britain | Sept. 5, 1951 |